No. 737,656. Patented September 1, 1903.

UNITED STATES PATENT OFFICE.

LA FAYETTE R. PARSONS, OF DETROIT, MICHIGAN.

VACCINE AND PROCESS OF PREPARING SAME.

SPECIFICATION forming part of Letters Patent No. 737,656, dated September 1, 1903.

Application filed February 15, 1902. Serial No. 94,319. (No specimens.)

*To all whom it may concern:*

Be it known that I, LA FAYETTE R. PARSONS, a citizen of the United States, residing at Detroit, in the county of Wayne and State of Michigan, have invented certain new and useful Improvements in Vaccine and Processes of Purifying the Same, of which the following is a specification, reference being had therein to the accompanying drawings.

This invention consists in an improved vaccine and in the process of purifying the same so as to eliminate foreign germs or bacteria that may exist therein without destroying the activity of the vaccine matter itself.

To this end the process consists in mixing with the vaccine material (the scab, pulp, or lymph) which are ordinarily taken from the animal trichlortertiary-butyl alcohol or its solutions.

In carrying out my process of purifying the vaccine I proceed, first, in the usual way to take from the animal the vaccine material, unusually including the scab, pulp, or lymph, or any one of them, as may be desirable, and thoroughly triturate the same and then mix with the triturated vaccine a small per cent. of trichlortertiary-butyl alcohol or its solutions, adding any desired quantity; but I usually add one per cent. of the weight of the vaccine. This mixture is then allowed to stand long enough to kill the foreign germs. This has been effected in four hours; but it is customary to alloy it to stand twenty-four to forty-eight hours. It may stand much longer without destroying the activity of the virus. The only essential is that it shall stand long enough to destroy the foreign germs or bacteria. It is now ready for use in any of the usual ways, either by direct application to the patient or application to points or placing in glass tubes or any other of the customary methods of sending out or using the vaccine for smallpox. I find by careful experiment and test that this treatment of the vaccine will usually destroy all foreign germs or bacteria and yet will have no apparent deterioration upon the vaccine itself.

What I claim as my invention is—

1. The herein-described vaccine for smallpox, consisting of the vaccine material from animals inocculated with smallpox-vaccine mixed with trichlortertiary-butyl alcohol, or its solution.

2. The herein-described process of purifying vaccine, which consists in thorougly mixing the vaccine material from animals inocculated with smallpox-vaccine with trichlortertiary-butyl alcohol, or its solutions, and allowing the mixture to stand for four hours or longer, substantially as and for the purpose set forth.

In testimony whereof I affix my signature in presence of two witnesses.

LA FAYETTE R. PARSONS.

Witnesses:
LULU MCDERMID,
JATSUTJO OHUO.